United States Patent
Polanyi et al.

(10) Patent No.: US 7,386,453 B2
(45) Date of Patent: Jun. 10, 2008

(54) DYNAMICALLY CHANGING THE LEVELS OF READING ASSISTANCE AND INSTRUCTION TO SUPPORT THE NEEDS OF DIFFERENT INDIVIDUALS

(75) Inventors: Livia Polanyi, Palo Alto, CA (US); Martin Henk Van Den Berg, Palo Alto, CA (US)

(73) Assignee: Fuji Xerox, Co., Ltd, Tokyo (JP)

(*) Notice: Subject to any disclaimer, the term of this patent is extended or adjusted under 35 U.S.C. 154(b) by 1243 days.

(21) Appl. No.: 09/987,420

(22) Filed: Nov. 14, 2001

(65) Prior Publication Data

US 2003/0093275 A1 May 15, 2003

(51) Int. Cl.
*G10L 21/00* (2006.01)
(52) U.S. Cl. .................. 704/270; 704/251; 434/167
(58) Field of Classification Search ............ 704/251, 704/1, 4, 5, 231, 270; 434/167
See application file for complete search history.

(56) References Cited

U.S. PATENT DOCUMENTS

| | | | |
|---|---|---|---|
| 4,456,973 A * | 6/1984 | Carlgren et al. ............... 704/1 |
| 5,428,707 A * | 6/1995 | Gould et al. ............... 704/231 |
| 5,634,086 A * | 5/1997 | Rtischev et al. ............ 704/270 |
| 5,799,276 A * | 8/1998 | Komissarchik et al. ..... 704/251 |
| 5,909,666 A * | 6/1999 | Gould et al. ............... 704/251 |
| 5,915,236 A * | 6/1999 | Gould et al. ............... 704/251 |
| 5,920,836 A * | 7/1999 | Gould et al. ............... 704/251 |
| 5,920,837 A * | 7/1999 | Gould et al. ............... 704/251 |
| 6,073,097 A * | 6/2000 | Gould et al. ............... 704/251 |
| 6,181,909 B1 * | 1/2001 | Burstein et al. ............... 704/5 |
| 6,366,759 B1 * | 4/2002 | Burstein et al. ............... 704/4 |
| 6,544,039 B2 * | 4/2003 | Fiedorowicz et al. ....... 434/167 |
| 6,571,209 B1 * | 5/2003 | Cohen et al. ............... 704/251 |
| 6,594,629 B1 * | 7/2003 | Basu et al. ................. 704/251 |

FOREIGN PATENT DOCUMENTS

EP 1 013 222 A1 * 6/2000

OTHER PUBLICATIONS

U.S. Appl. No. 09/609,325, filed Jun. 30, 2000, Polanyi et al.
U.S. Appl. No. 09/742,449, filed Dec. 22, 2000, Polanyi et al.
U.S. Appl. No. 09/689,779, filed Oct. 13, 2000, Polanyi et al.
U.S. Appl. No. 09/883,345, filed Jun. 19, 2001, Polanyi et al.
U.S. Appl. No. 09/630,371, filed Aug. 1, 2000, Polanyi et al.

* cited by examiner

*Primary Examiner*—Angela A. Armstrong
(74) *Attorney, Agent, or Firm*—Sughrue Mion, PLLC

(57) ABSTRACT

Techniques for dynamic personalized reading instruction at word and sentence level are provided by determining word recognition level and learning gradient information for a user. Comprehension aids are associated with words classified by word recognition level and stored. Word recognition errors are determined, comprehension aids presented and word recognition level adjusted based on determined word recognition errors, learning gradient and current word recognition level. For sentence level dynamic personalized reading instruction personalization information, reading level and learning gradient are determined and a personalized grammatical tunable text summary generated. Based on the personalized grammatical tunable text summary, comprehension questions are generated and displayed. Based on comprehension responses, learning gradient and personalization information, the reading level is adjusted. Personalized reading instruction is provided by selectively changing display attributes of more salient information to help a user identify the important information in the sentence and to maintain fluid reading.

31 Claims, 9 Drawing Sheets

<Frank> went into the garage to look for his bicycle. The bicycle was on a hook high up on the wall next to his father's car. <Frank> was not tall enough to reach the bicycle so he stood on the hood of the car. <Frank> still couldn't reach the bicycle. Just then, <Frank>'s <father> walked into the garage. <Frank>'s <father> helped Frank to lift his bicycle down from the wall.

DYNAMICALLY CHANGING THE LEVELS OF READING ASSISTANCE AND INSTRUCTION TO SUPPORT THE NEEDS OF DIFFERENT INDIVIDUALS

INCORPORATION BY REFERENCE

The following co-pending applications: "SYSTEM AND METHOD FOR TEACHING WRITING USING MICROANALYSIS OF TEXT" by Livia Polanyi et al., filed as U.S. application Ser. No. 09/609,325; "SYSTEM AND METHOD FOR TEACHING SECOND LANGUAGE WRITING SKILLS USING THE LINGUISTIC DISCOURSE MODEL" by Livia Polanyi et al., filed as U.S. application Ser. No. 09/742,449; "SYSTEM AND METHOD FOR GENERATING TEXT SUMMARIES" by Livia Polanyi et al., filed as U.S. application Ser. No. 09/689,779; "SYSTEMS AND METHODS FOR GENERATING ANALYTIC SUMMARIES" by Livia Polanyi et al., filed as U.S. application Ser. No. 09/883,345; "SYSTEM AND METHOD FOR WRITING ANALYSIS USING THE LINGUISTIC DISCOURSE MODEL" by Livia Polanyi et al., filed as U.S. application Ser. No. 09/630,371; are each incorporated herein by reference in the entirety.

BACKGROUND OF THE INVENTION

1. Field of Invention

This invention relates to computer-assisted dynamic personalized reading instruction.

2. Description of Related Art

In conventional systems for reading instruction, students' reading abilities are tested and the students are grouped according to determined reading ability and instructor availability. Milestones or achievements standards are established for students based on age grade or other criteria. Re-testing of students then occurs at regular intervals and the results compared to milestones for similarly classified groups of students. Remedial reading instruction such as individual instruction may then be provided for students who fail to achieve the milestones or achievement standards for similarly classified students. However, these types of instruction do not facilitate fluid reading of multiple sentences for meaning.

Moreover, studies indicate that reading comprehension for students placed in remedial instruction is not significantly improved. Placing students in remedial instruction programs may reduce a student's motivation to learn since the student is isolated from peer group members during remedial instruction. Also, placing students in remedial instruction programs may reduce competitive learning behaviors among students in the remedial instruction group.

SUMMARY OF THE INVENTION

The systems and methods according to this invention provide dynamic personalized reading instruction. The systems and methods for dynamic personalized reading instruction according to this invention provide users dynamic personalized reading instruction at the word and sentence levels. Also the systems and methods for dynamic personalized reading instruction according to this invention provide for personalizing selected texts for each user based on personalization information, reading level and/or learning gradient information.

In various exemplary embodiments according to this invention, words are categorized based on a word recognition level and comprehension aids are associated with the categorized words. A word recognition level and learning gradient are determined for each user. New words are presented to the user based on the user's word recognition level and learning gradient. Performance in word recognition tasks may be determined. Comprehension aids such as visual aids may be presented to the user based on the determined performance of the user. The comprehension aids assist in integrating word concepts into the user's worldview or knowledge base. In various exemplary embodiments, the word recognition level and/or learning gradient for the user may also be dynamically adjusted based on performance responses of the user. The systems and methods according to this invention thereby integrate testing and learning of word level concepts into a single user experience to build on determined strengths and to focus teaching resources on the determined weaknesses.

In various other exemplary embodiments according to this invention, sentence level dynamic personalized reading instruction is provided based on the user's current reading level, learning gradient and personalization information. Personalization information includes age of the user, mother language of the user, parental status or any other known or later identified pedagogically useful information. A tunable text summary is determined based on the personalization information, reading level and learning gradient and displayed for reading instruction. Comprehension questions are generated based on the tunable text summary and the tunable text summary displayed. In various other exemplary embodiments according to this invention, a display of the tunable text summary provides dynamic personalized reading assistance by displaying the salient information using alternate display attributes.

DETAILED DESCRIPTION OF EXEMPLARY EMBODIMENTS

Figure 1:
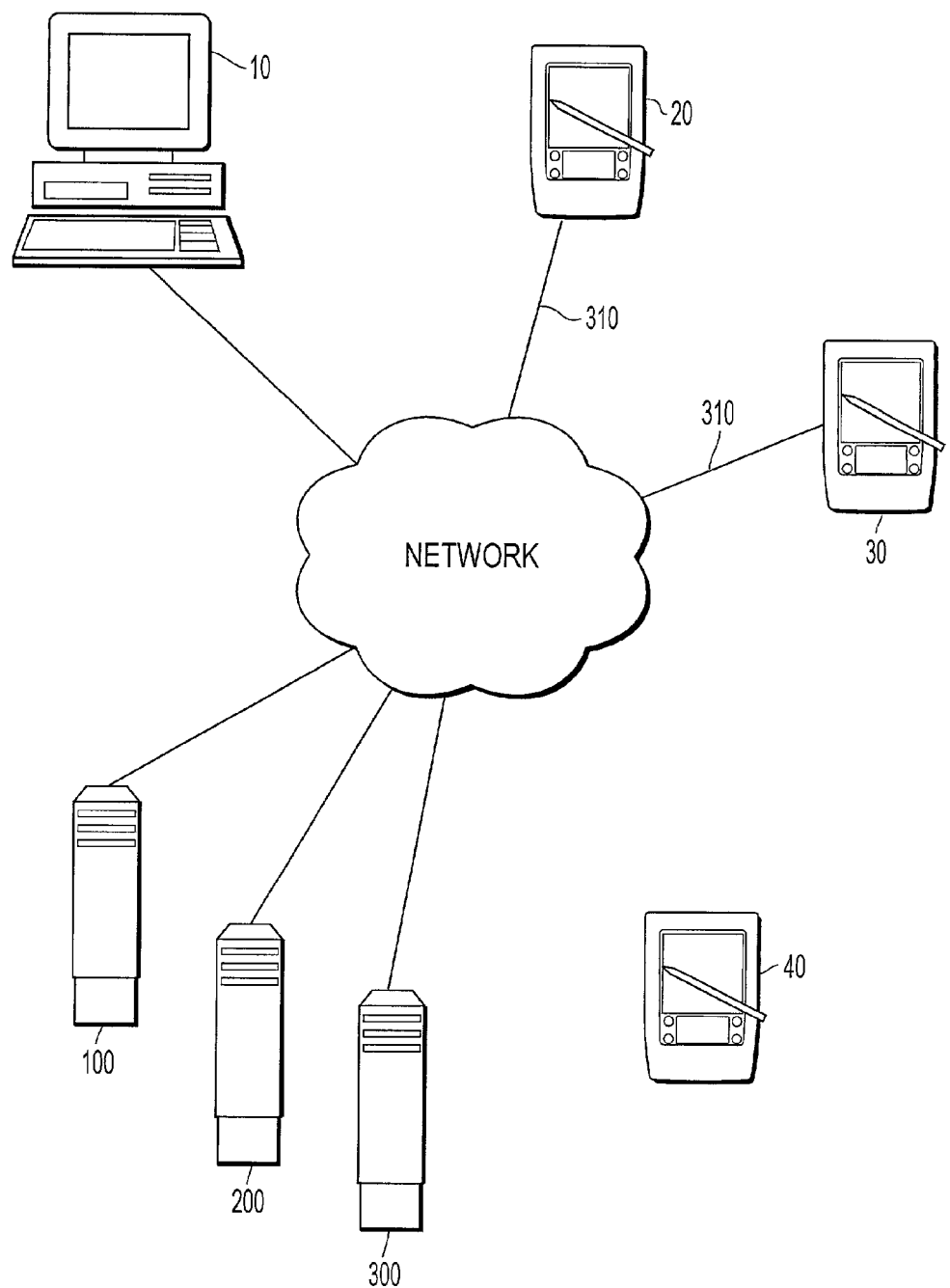
FIG. 1 shows an overview of various exemplary dynamic personalized reading instruction systems according to this invention.

FIG. 1 shows an overview of various exemplary dynamic personalized reading instruction systems 100-300 according to this invention. Web-enabled computer 10, web-enabled personal digital assistant 20, web-enabled personal digital assistant 30, and word level dynamic personalized reading instruction system 100, sentence level dynamic personalized reading instruction system 200 and combined word/sentence level dynamic personalized reading instruction system 300 are each connected via communications links 310. FIG. 1 also shows dynamic personalized dynamic reading instruction enabled personal digital assistant 40.

A user of web-enabled computer 10 initiates a personalized reading instruction session with the word level dynamic personalized reading instruction system 100, the sentence level dynamic personalized reading instruction system 200 and/or combined word/sentence level dynamic personalized reading instruction system 300 over communications links 310. For example, in various exemplary embodiments according to this invention, the dynamic personalized reading instruction systems 100-300 may be implemented as web servers, digital libraries, information repositories or any other known or later developed information source. In various exemplary embodiments according to this invention, a personalized reading instruction session is initiated by requesting a login web page served by anyone of the word/sentence level or combined word/sentence level dynamic personalized reading instruction system 100-300 and associated with a uniform resource locator or URL. It will be apparent that in various other embodiments according to this invention, the personalized reading instruction systems 100-300 may be located within a dedicated server, within a content server which also provides instructional content or at any other location accessible by communications links 310. In various other embodiments according to this invention, any one or more of the personalized reading instruction systems 100-300 may be located within a user access device such as dynamic personalized reading instruction enabled personal digital assistant 40 without departing from the spirit or scope of this invention.

For example, the dynamic personalized reading instruction system 100 forwards the requested login web page to web-enabled computer 10 over communication links 310. User identifying information is entered and returned to the dynamic personalized reading instruction system 100. Based on user identifying information, previously stored word recognition level, reading level personalization, learning gradient and user personalization information is retrieved for each user. Word level or sentence level dynamic personalized reading instruction is initiated based on personalization information and/or prior user session information. In various exemplary embodiments according to this invention, word level instruction is used to familiarize the user with word concepts using comprehension aids such as graphic icons, animation clips, video and/or sound clips or any other information useful in conveying the concept to the user. The words and associated comprehension aids are displayed with a layout complexity based on the user's dynamically determined performance and/or current word recognition level. Display words are dynamically selected from a list of previously categorized words based on the current word recognition level, learning gradient and/or personalization information for the identified user.

Sentence level instruction familiarizes the user with fluid reading. In particular, the dynamic personalized reading instruction systems 200-300 provide an integrated and supportive platform that helps users transition from single sentence parsing of texts to integrated fluid reading. In fluid reading, the user absorbs new information by exploiting the user's existing understanding of the sentence. In sentence level instruction, a text is retrieved and analyzed further using a theory of discourse analysis such as the Linguistic Discourse Model discussed in "System and Method for Teaching Writing Using Microanalysis of Text". In various other exemplary embodiments, Discourse Structures Theory, Linguistic Discourse Model, Rhetorical Structure Theory, Systemic Functional Grammar and/or Tagmemics may be used in the practice of this invention. A tunable text summary is generated. For example, the tunable text summary may be generated using any of the systems and methods discussed in "Systems and Methods for Generating Text Summaries" and "Systems and Methods for Generating Analytic Summaries". Alternatively, any other known or later developed system or method of generating a grammatical tunable text summary may be used in the practice of this invention.

Based on the performance and personalization information of the user of web-enabled computer 10, a personalized, tuned version of the text and/or sentence is displayed to the user. If the user indicates that assistance reading the sentence is required, the more salient information in the sentence is displayed with an alternate display attribute. For example, the more salient information may be highlighted using highlighting, bolding, alternate color or output using an alternate voice for speech output or using any other known or later developed method of highlighting the salient information. The highlighted salient information prompts the user to focus on the familiar, core knowledge in the sentence while integrating the unfamiliar concepts in portions of the sentence. In this way, the user is trained to integrate new information by exploiting existing knowledge of semantic and grammatical constraints. It will be apparent that a user's understanding of concepts is dynamically monitored by the systems and methods for dynamic personalized reading instruction. Thus, in various exemplary embodiments according to this invention, the user's core knowledge may be deduced from previous personalized reading instruction sessions for the user.

Based on the user's current reading level and learning gradient, salient information is selected for display. For example, the rank of information displayed from a tunable text summary is dynamically adjusted to present more or less difficult sentences to a user. Personalization information is also used to personalize the selected instructional text to heighten user interest and/or to present the selected instructional text using a language specific layout. For example, personalization information specifying a language of instruction is used to specify the vertical alignment of the selected instructional text. A user learning to read using a Japanese or Chinese language text is determined and based on determined reading level an appropriate text layout is determined. More complex text layout including horizontal alignments and the like may be introduced as the user progresses to more advanced reading levels.

Users of web-enabled personal digital assistants 20-30 may similarly initiate personalized reading instruction sessions with any of the dynamic personalized reading instruction systems 100-300. As discussed above, it will be apparent that the word level, sentence level and combined word and sentence level dynamic personalized reading instruction system 100-300 may be combined within dynamic personalized reading instruction enabled personal digital assistant 40 in a single device and operated in a stand-alone configuration without departing from the spirit or scope of this invention.

Figure 2:
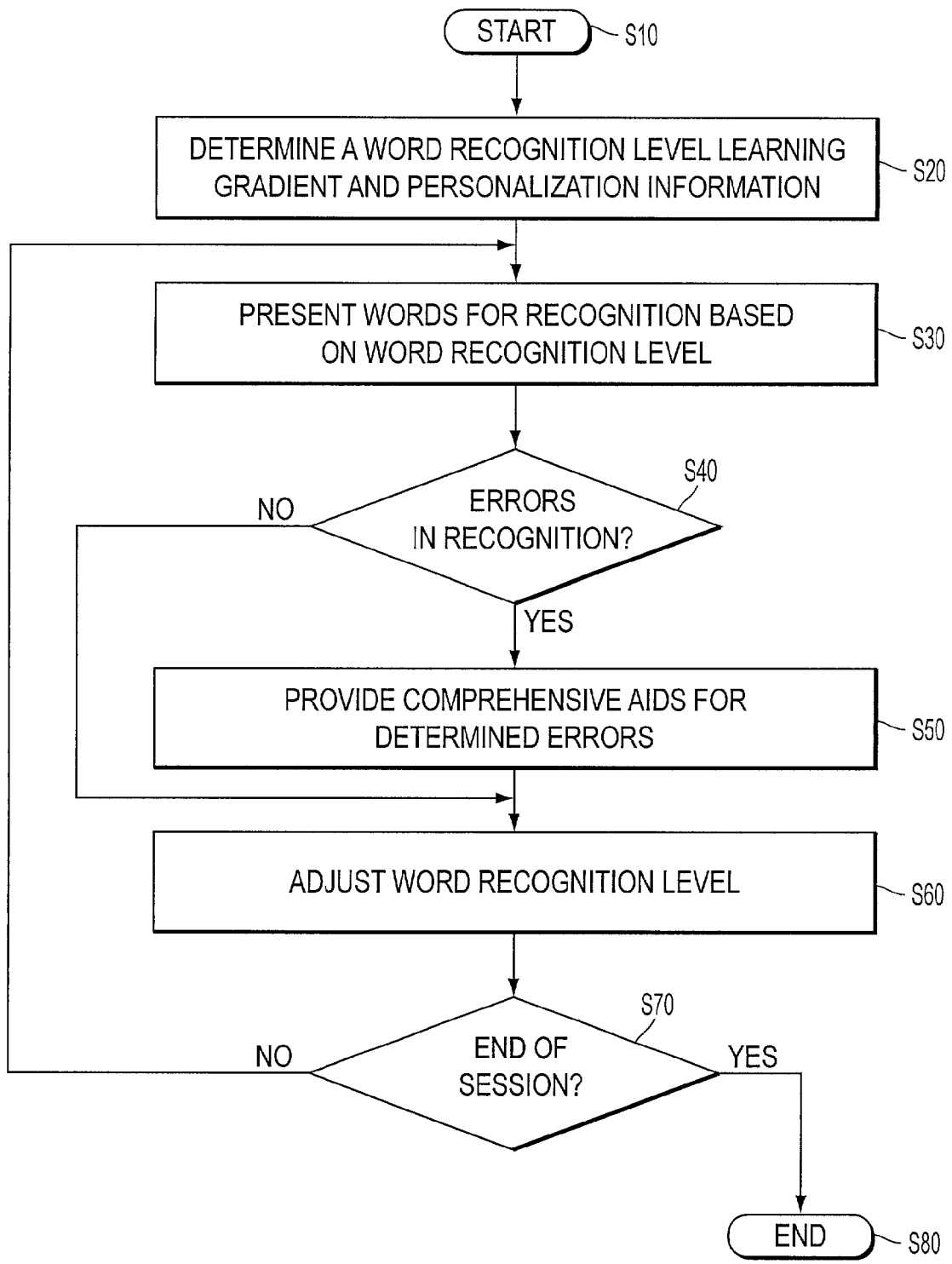
FIG. 2 is a flowchart of an exemplary word level method of dynamic personalized reading instruction according to this invention.

FIG. 2 is a flowchart of an exemplary word level method of dynamic personalized reading instruction according to this invention. The process begins at step S10 and immediately continues to step S20. In step S20, a word recognition level, learning gradient information and personalization information are determined for the user. The word recognition level indicates the user's command, recognition, integration and/or understanding of the meaning associated with a word. For example, a user may be prompted for a grade and level within a grade indicating a current position within the reading instruction program. A word recognition level may then be determined based on the grade and level within the grade. Learning gradient information indicates how quickly a user can tolerate changes between recognition levels. Personalization information includes information such as a user's age, mother language or other pedagogically useful information. In various other exemplary embodiments according to this invention, the user's word recognition level, learning gradient information and personalization information may be saved from a prior session within the system, may be stored on an information storage device such as an electronic memory card, a bar code identifier or retrieved from any other storage device. The portable storage device or memory card may be carried with the user, stored on a central repository and retrieved based on identification information provided by the user or may be entered using any other known or later developed technique without departing from the spirit or scope of this invention. Control continues to step S30.

In step S30, words are presented to the user based on the word recognition level determined in step S20. For example, in one embodiment according to this invention, words are classified based on word recognition levels and stored. As a user masters a sufficient number of words at a first recognition level, selection probabilities for further words are adjusted to increase the probability of selecting further words from the words classified at higher recognition levels. However, it will be apparent that any known or later developed method of selecting further words based on recognition levels may be used in the practice of this invention. Control continues to step S40.

In step S40, a determination is made whether an error in recognizing the word has occurred. Word recognition of a displayed word may be determined by prompting the user to select a comprehension aid representative of the displayed word from a screen containing other comprehension aids such as graphic icons and the like. In various other exemplary embodiments according to this invention, the other graphic icons may be associated with words having similar sounds and/or which have been found to frequently confuse users of a similar word recognition level.

For classified words associated with attributes such as color, size and the like, a prompt to match color attributes between the word and the visual aid may be used. The user is provided with a visual aid such as a green graphic icon, animation, sound and/or movie clip, or any other comprehension aid useful in describing the concept of the word to the user. For example, the color description information in the sentence is displayed using a red font color to quickly draw the user's attention to the color differences. The user then adjusts the color of the "apple" graphic icon to match the font color of the corresponding concept or word in the sentence. The user may click on the graphic icon associated with the word or otherwise select the graphic icon. Once the graphic icon has been selected, the user may select an alternate color using a color palette. If the selected color matches the text color, the user's response is determined to be correct. Similarly, for size, a continuum of graphic icons of different sizes may be displayed. Above each of the graphic icon comprehension aids, words associated with the differently sized graphic icons are displayed. For example, in various exemplary embodiments, the words, biggest, smallest, small and smaller are displayed above graphic icons of balls having similar size inter-relationships. As the user selects and manipulates the graphic icons, the association of the word with the concept is reinforced by the display of the comprehension aid. In this way, the user quickly gains an understanding of the context within which the word is used without requiring complete mastery of the language.

The responses of the user are monitored and recognition errors determined. If a determination is made that no recognition errors have occurred, control continues to step S60. Otherwise control continues to step S50. If recognition errors are determined to have occurred, comprehension aids associated with the determined recognition errors are displayed to the user in step 50. Comprehension aids may display the word using an alternate sentence and/or may illustrate concepts associated with the word by display of a graphic icon, sound and/or movie clip representative of the word.

In various other exemplary embodiments according to this invention, a display attribute such as color or size of the graphic icon representative of the word may be dynamically changed to illustrate the concept. For example, if it is determined that the user did not correctly recognize the word "red", an explanatory sentence such as "the apple is green" is displayed. The word "green" in the explanatory sentence is highlighted with a green color font. A graphic icon of a green apple is also displayed. The graphic icon depicting the green apple slowly changes in color from green to red as the word "green" in the sentence also changes from green to red. In this way the user's understanding of the concept of the color red is integrated with the user's existing conceptual knowledge of the color green, supported by the user's understanding of concepts in the explanatory sentence and visually reinforced with both the apple graphic icon comprehension aid and the font color of the text. After comprehension aids are displayed for the errors determined in step S50, control continues to step S60.

In step S60, the word recognition level is dynamically adjusted based on the word recognition performance of the user. For example, in various exemplary embodiments according to this invention, the word recognition level is adjusted based on the determined number of word recognition errors, and/or the determined number of correct responses of the user. However, it will be apparent that in various other embodiments according to this invention, the word recognition level may be adjusted based on determined strengths, determined errors, speed of user response or any known or later developed method of adjusting the word recognition level based on the user's responses. In this way, a word recognition level may be selected which provides challenging new material without overwhelming the user with overly advanced material. After adjusting the word recognition level, control continues to step S70.

In step S70 a determination is made whether the user has requested that the personalized reading instruction session be ended. The end of the personalized reading instruction session is indicated by the user selecting a "quit" option from a pull down menu, entering a voice command, a keyboard sequence, exceeding a determined period of inactivity, completing the instruction session or any other known or later developed method of indicating the end of the personalized reading instruction session.

If it is determined that the user has not requested an end of the personalized reading instruction session, control continues to step S30 and steps S30 through S70 are repeated until it is determined in step S70 that an end of the personalized reading instruction session has been requested. Control then continues to step S80 and the process ends.

Figure 3:
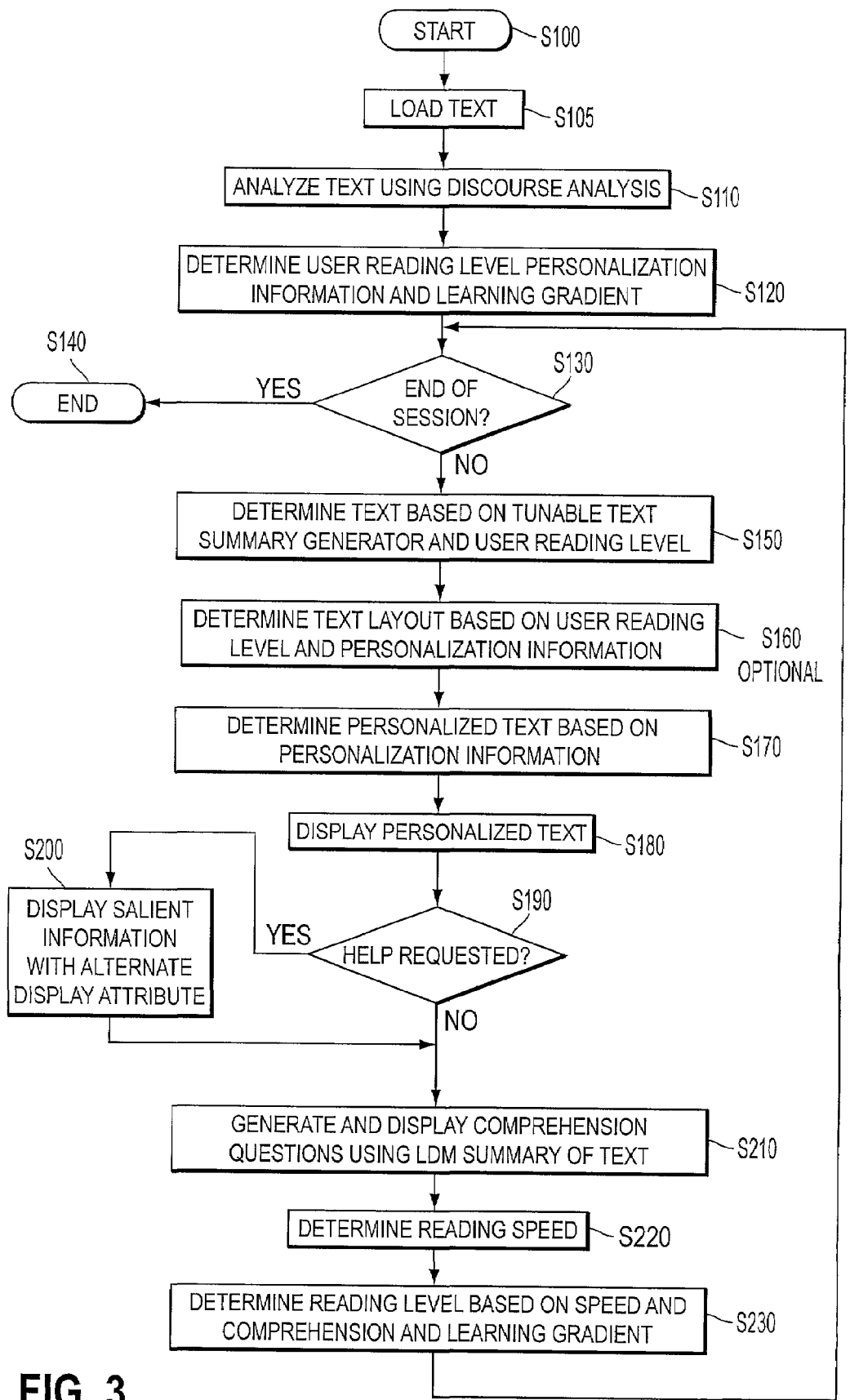
FIG. 3 is a flowchart of an exemplary sentence level method of dynamic personalized reading instruction according to this invention.

FIG. 3 is a flowchart of an exemplary sentence level method of dynamic personalized reading instruction according to this invention. Control begins at step S100 and immediately continues to step S105.

In step S105, a text is selected and loaded into memory. The text may be selected from a library of previously reviewed textual material appropriate for the reading level of the users. However, in various other exemplary embodiments according to this invention, texts may be automatically reviewed based on an automatic scoring of linguistic difficulty. A library manager may be used to select texts for users based on determined reading level and personalization information. The selected text material may be stored in a word processing format, such as Microsoft Word®, rich text format, Adobe® Portable Document Format (PDF), hypertext markup language (HTML), extensible markup language (XML), extensible hypertext markup language (XHTML), open eBook format (OEB), ASCII text or any other known or later developed document format. After selecting and loading the text, control continues to step S110.

The text is analyzed using a theory of discourse analysis in step S110. The text may be analyzed using the linguistic discourse model discussed above or may be analyzed using any other known or later developed method of discourse analysis. Control continues to step S120.

In step S120, the reading level, learning gradient and personalization information for the user is entered. Reading level information indicates the user's current position within a reading instruction curriculum. In various embodiments according to this invention, the reading level may be input directly by the user, determined dynamically through testing sequences, retrieved from a log of the user's previous personalized reading instruction sessions or by using any other known or later developed method for determining a reading level.

Personalization information for the user may also be entered at the beginning of the session. However, in various other exemplary embodiments, the personalization may be retrieved from a previous personalized reading instruction session, retrieved from a centralized registrar of records or determined using any other known or later developed method of determining pedagogically useful information. For example, the personalization information may include family name and family relationship information useful in personalizing the analyzed text for the user. For a male child user with a reading level of "8" and a first name of "Frank", the analyzed text is dynamically adjusted to substitute the name of Frank for the protagonist in the adjusted text. The appropriate pronouns in the text are adjusted to the correct gender to maintain user interest. It will be apparent that any pedagogically useful information may be used to generate a personalized text. Names of the user's relatives and/or friends, cultural background of the user or any other personalization information may be used to generate a personalized text. Learning gradient information indicating the projected speed of the user's progression between reading levels may also be entered. Control continues to step S130.

In step S130, a determination is made whether the user has requested that the personalized reading instruction session be ended. The end of the personalized reading instruction session is indicated by the user selecting a "quit" option from a pull down menu, entering a voice command, a keyboard sequence, exceeding a determined period of inactivity, completing the instruction session or any other known or later developed method of indicating the end of the personalized reading instruction session. If a determination is made that the user has requested an end of the personalized reading instruction session, control continues to step S140 where the process ends. If a determination is made that the user has not requested an end of personalized reading instruction session, control continues to step S150.

In step S150, a tunable text summary is generated based on the determined reading level of the user. A tunable text summary may be generated as described in the "Systems and Methods for Generating Text Summaries", "Systems and Methods for Generating Analytic Text Summaries" or any other summary generator capable of generating grammatical tunable text summaries. The tunable text summary is used to adjust the display text based on the user's determined reading level. In various exemplary embodiments according to this invention, a shorter and/or simpler text is displayed based on the determined reading level of the user. For example, a shorter and/or simpler sentence may be displayed which simplifies the sentence while preserving the salient information and grammaticality of the sentence. The shorter simpler grammatical sentences facilitate reading comprehension by low reading level users. It will be apparent that the use of the tunable text summary to generate simpler texts is merely illustrative and that any method of generating grammatically simpler text may be used in the practice of this invention. Control continues to optional step S160.

In optional step S160, a layout of the text is determined based on the user reading level, and/or user personalization information. Since overly complex text layout may distract a user from focusing attention on sentence level comprehension, a simpler less complex text layout may be selected for low reading level users.

For example, comprehension aids such as visual aids are more likely to be used by lower reading level users. Therefore, a less complicated text layout is selected for low reading level users that facilitates concept comprehension and which provides layout space for the comprehension aid. In various exemplary embodiments, a less complicated text layout is accomplished by positioning the text and the associated comprehension aid in close proximity. In the exemplary sentence, "The apple is red", the sentence is displayed directly below a comprehension aid graphical icon of a red apple. As the user progresses through different a reading levels, the complexity of the associated text layout is dynamically adjusted. In various other exemplary embodiments according to this invention, the user's personalization information may also be used to adjust the comprehension aids, the text layout and/or to adjust the text based on the user's language, culture, age or any other known or later developed personalization information. For example, if the language of instruction is Chinese, the text layout may be adjusted to properly orient and display the text based on the vertical alignment the user is likely to encounter in introductory Chinese texts. Alternatively, the selection of the comprehension aids such as graphic icons, sounds and or movie clips and the like may be based on other personalization information such as age and/or cultural information. In this way, age and culturally appropriate comprehension aid graphic icons are selected for display. Although age, language and cultural information are discussed with respect to personalization information, it will be apparent that any personalization information may be used in the practice of this invention. After the optional text layout has been determined in step S160, control continues to step S170.

In step S170, the text is personalized based on the user personalization information. For example, the user's name or pre-determined names of friends may be substituted into appropriate portions of the text to heighten interest in the text. It will be apparent that age, cultural background or any other known or later developed personalization information may also be used in creating age and culturally appropriate personalization substitutions. Control continues to step S180.

In step S180, the personalized and adjusted text is displayed to the user. The personalized and adjusted text may be displayed on a video display terminal, a computer display, a personal digital assistant such as a Palm Pilot,® a Handspring Visor,® a Windows CE® computer, an electronic book or e-book reading device such as the Franklin Bookman,® the Zenith E-Book,® digital paper or any other known or later developed device capable of displaying text. Control continues to step S190.

In step S190 a determination is made as to whether the user has requested help in reading the displayed text. If it is determined that the user has requested help, control continues to step S200. Otherwise, control continues to step S210.

If a determination is made that the user has requested help, control continues to step S200 and a display attribute of the most salient information in the sentence is adjusted. For example, in various exemplary embodiments according to this invention, user attention is drawn to the most salient information by highlighting, bolding or changing some display attribute of the sentences in the text. The most salient portions of the sentence are determined by generating a tunable text summary and selecting information having low rank from the tunable text summary. The low rank portions of the tunable text summary are then displayed using an alternate display attribute. The alternate display attribute of the low rank/high salience portions of the tunable text summary draws attention to the most salient information in the sentence. In this way, the user can more easily comprehend the concept or idea of the sentence while maintaining the contextual relevance within the complete sentence.

It will be apparent that highlighting and bolding of the displayed sentences in the text is merely exemplary and that any method of indicating salient information in the text may be used in the practice of this invention. The salient information may be displayed using italics, displayed in a different color, output using a text to speech synthesizer with a different voice or displayed and/or output using any other known or later developed method of indicating salient information in the sentence without departing from the spirit or scope of this invention. Control continues to step S210.

In step S210, comprehension questions for the text are generated. For example, in various exemplary embodiments according to this invention, a tunable text summary is generated and the low ranked/high salience information is selected. The main verb in the tunable text summary is determined and used to generate comprehension questions. In the exemplary sentence, "The red apple fell from the tree"; the main verb "fell" is determined. A comprehension question is generated by pre-pending "What" to the determined main verb "fell" generating the question "What fell". In various other exemplary embodiments according to this invention, other portions tuned text summary are used to generate questions such as "What fell from the tree" or "The red apple fell from what" or "What did the red apple fall from" based on the determination of the main verb in the tuned text summary. The dynamic and/or programmatic generation of comprehension questions allows a wider variety of texts to be used in dynamic personalized reading instruction systems 100-300 since comprehension questions may be more easily generated for the text. After the comprehension questions are generated, control continues to step S220.

User reading speed is determined in step S220. In various exemplary embodiment according to this invention, user reading speed may be estimated by determining the time between the initial display of the text to the user and the completion of the associated comprehension questions. However, it will be apparent that any known or later developed technique of determining reading speed such as eye-tracking and the like may be used in the practice of this invention. Control continues to step S230.

In step S230, a reading level is determined based on the determined reading speed, comprehension level and learning gradient. For example, speed may be determined to be at 95% of the speed of other users at the same reading level. The comprehension level may be determined to be 95% of the material read. Based on the user's determined learning gradient and the speed and comprehension levels attained, the reading level of the user is dynamically adjusted. If the learning gradient indicates that progression between reading levels should be quick, the tunable text summary is dynamically adjusted to display future sentences of more complexity. In various exemplary embodiments according to this invention, more complex sentences may be selected for display by selecting higher rank/less salient information from the tunable text summary. As a result, longer and more complex sentences are displayed. Similarly, for a user having difficulty at the current reading level, low rank/high salience portions of the tunable text summary are selected to display a sentence of reduced complexity. It will be apparent that the tunable text summary is used to both provide help in understanding a sentence as requested by the user as well as to dynamically adjust the complexity of the next sentence for display within the context of the instructional text.

After adjusting the reading level, control jumps to step S130 where a determination is made whether the user has requested an end to the personalized reading instruction session. If an end of the personalized reading instruction session has not been requested, steps S150-S230 are repeated until a determination is made in step S130 that an end of session has been requested. When a determination is made that the end of the personalized reading instruction session has been requested, control continues to step S140 and the process ends.

Figure 4:
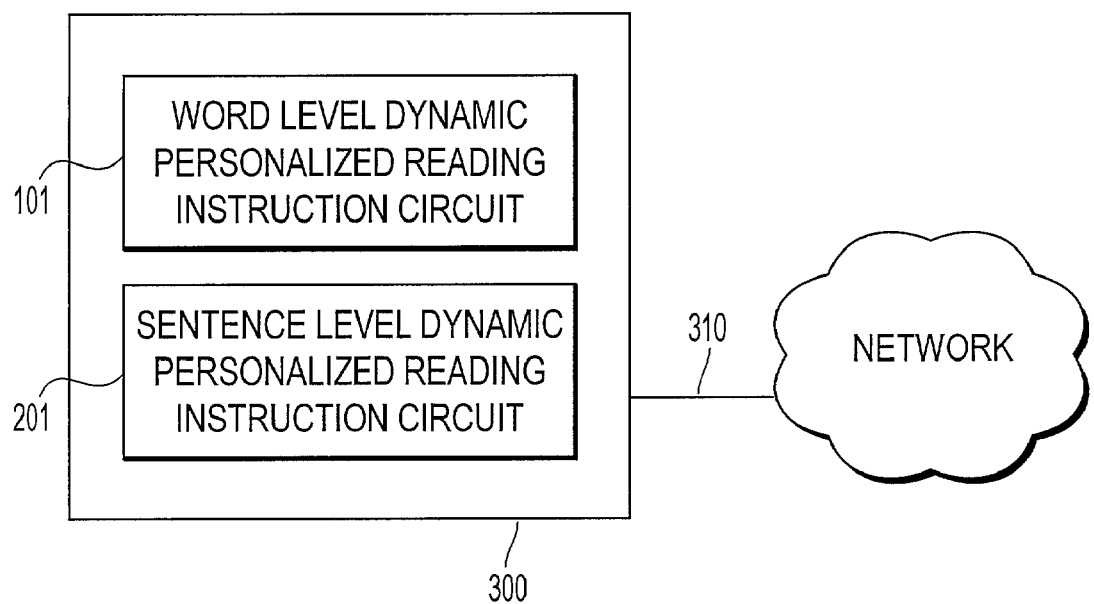
FIG. 4 shows an exemplary word and sentence level dynamic personalized reading instruction system according to this invention.

FIG. 4 shows an exemplary word and sentence level dynamic personalized reading instruction system 300 according to this invention. The word and sentence level dynamic personalized reading instruction system 300 comprises a word level dynamic personalized reading instruction circuit 101 and a sentence level dynamic personalized reading instruction circuit 201 connected to communications link 301. The word level dynamic personalized reading instruction system 101 performs word level reading instruction for each user. According to this exemplary embodiment of the dynamic personalized reading instruction system, a user may progress from word level instruction to sentence level instruction using the same device. Sentence level dynamic personalized reading instruction is provided by the dynamic personalized reading instruction circuit 201.

Figure 5:
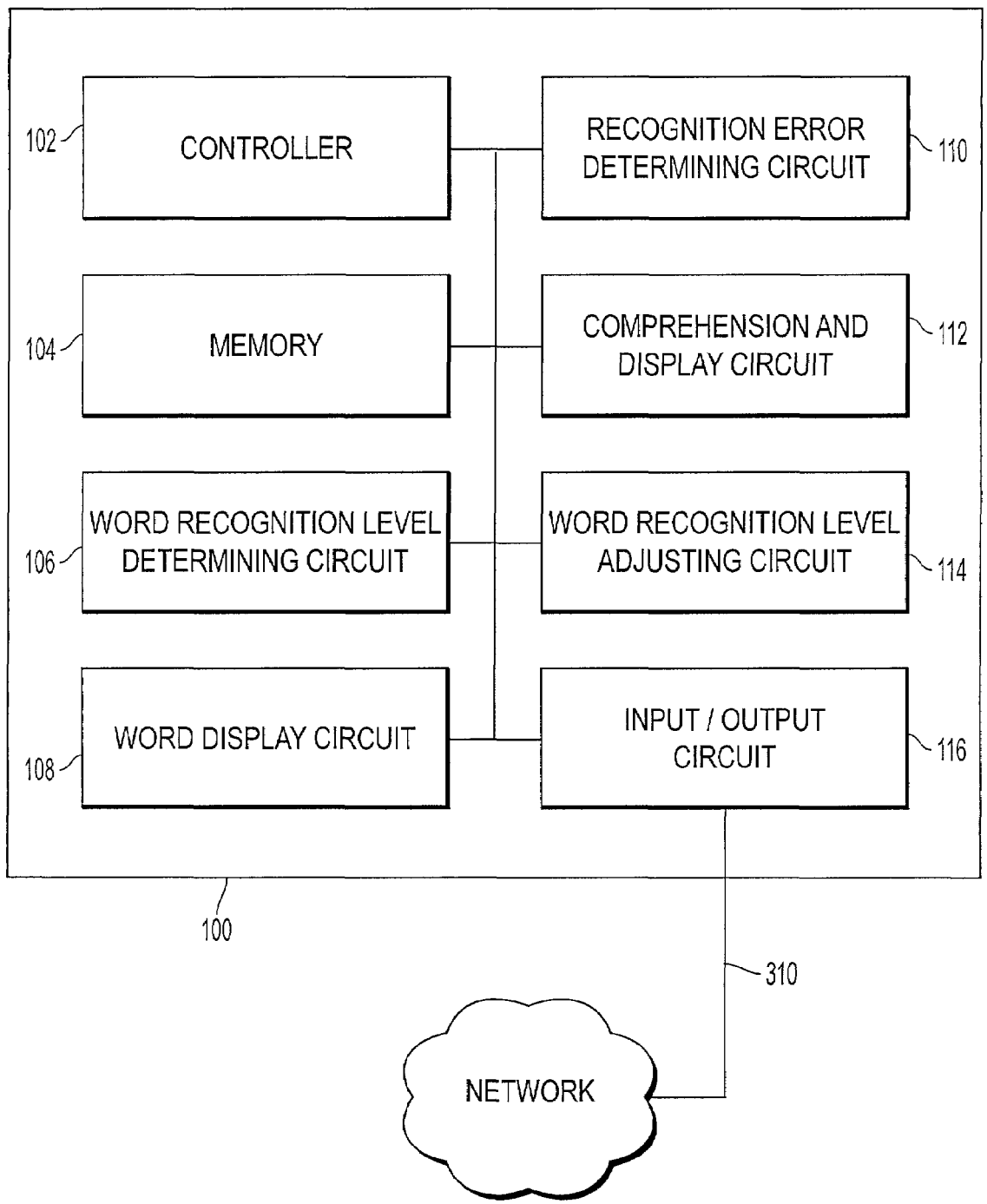
FIG. 5 shows an exemplary word-level dynamic personalized reading instruction system according to this invention.

FIG. 5 shows an exemplary word-level dynamic personalized reading instruction system 100 according to this invention. Controller 102, memory 104, word recognition level determining circuit 106, word display circuit 108, recognition error determining circuit 110, comprehension aid display circuit 112, word recognition level adjusting circuit 114 are each connected through input/output circuit to communication link 310.

Input/output circuit 116 receives user information such the user's word recognition level, learning gradient and personalization information over communications links 310. In various other exemplary embodiments according to this invention, a received user identifier maybe used to retrieve previously stored word recognition level, learning gradient and personalization information from memory 104.

If no word recognition level is entered for the user or if no word recognition level is retrieved based on a user identifier, the word recognition level determining circuit 106 is activated to determine the users current word recognition level. In various embodiments according to this invention, the determination of word recognition level may be based on the user's current grade level and/or age. For example, a kindergarten student may be initially assigned a word recognition level of 100 while a six year old user may be assigned a word recognition level of 200. In various other embodiments according to this invention, a sample testing sequence may be initiated to determine the user's initial word recognition level. However, it will be apparent that any known or later developed method of determining a word recognition level for a user may be used without departing from the spirit or scope of this invention.

Controller 102 retrieves previously stored words and associated comprehension aids such as graphical icons from memory 104. The words for display are selected based on the word recognition level and learning gradient determined for the user. The learning gradient determines how quickly a user is transferred between different word recognition levels.

The word display circuit 108 is activated to display the word on the display along with a comprehension question. The word display circuit determines the type of layout to use in displaying the word. A simple text layout is selected for users at lower word recognition levels so that the users can gain familiarity with the equivalence between the printed word and the meaning of the word expressed by the comprehension aid. Comprehension questions are generated based on the determined word recognition level. For example, users having lower determined word recognition levels are prompted with simpler questions requiring selecting or matching the size or color of a comprehension aid such as a graphical icon.

Recognition error determining circuit 110 is activated to determine if a recognition error has occurred. If a recognition error is determined, the comprehension aid display circuit 112 is activated. A comprehension aid is used to explain a concept to a user. Comprehension aids may include, but are not limited to, a graphical icon explaining the concept, an animated display of the concept, sound or movie clips explaining the concept or any other known or later developed method of explaining a concept. For example, for recognized errors in identifying the equivalence between the word "red" and the color red, the word "red" is displayed in red on the screen and a graphic icon of a red apple is also displayed. The user is prompted to interactively select the word and change the word text and display color to a second color. The color of the associated comprehension aid graphic icon simultaneously reflects the user changes. Similarly, as the user selects alternate colors for the comprehension aid graphical icon, the changes are simultaneously reflected in the associated word and font color displayed.

Word recognition level adjusting circuit 114 is activated to determine a new word recognition level based on the determined performance of the user and the determined learning gradient. Words and associated comprehension icons such as graphic icons from the adjusted word recognition level are then selected and displayed to the user.

Figure 6:
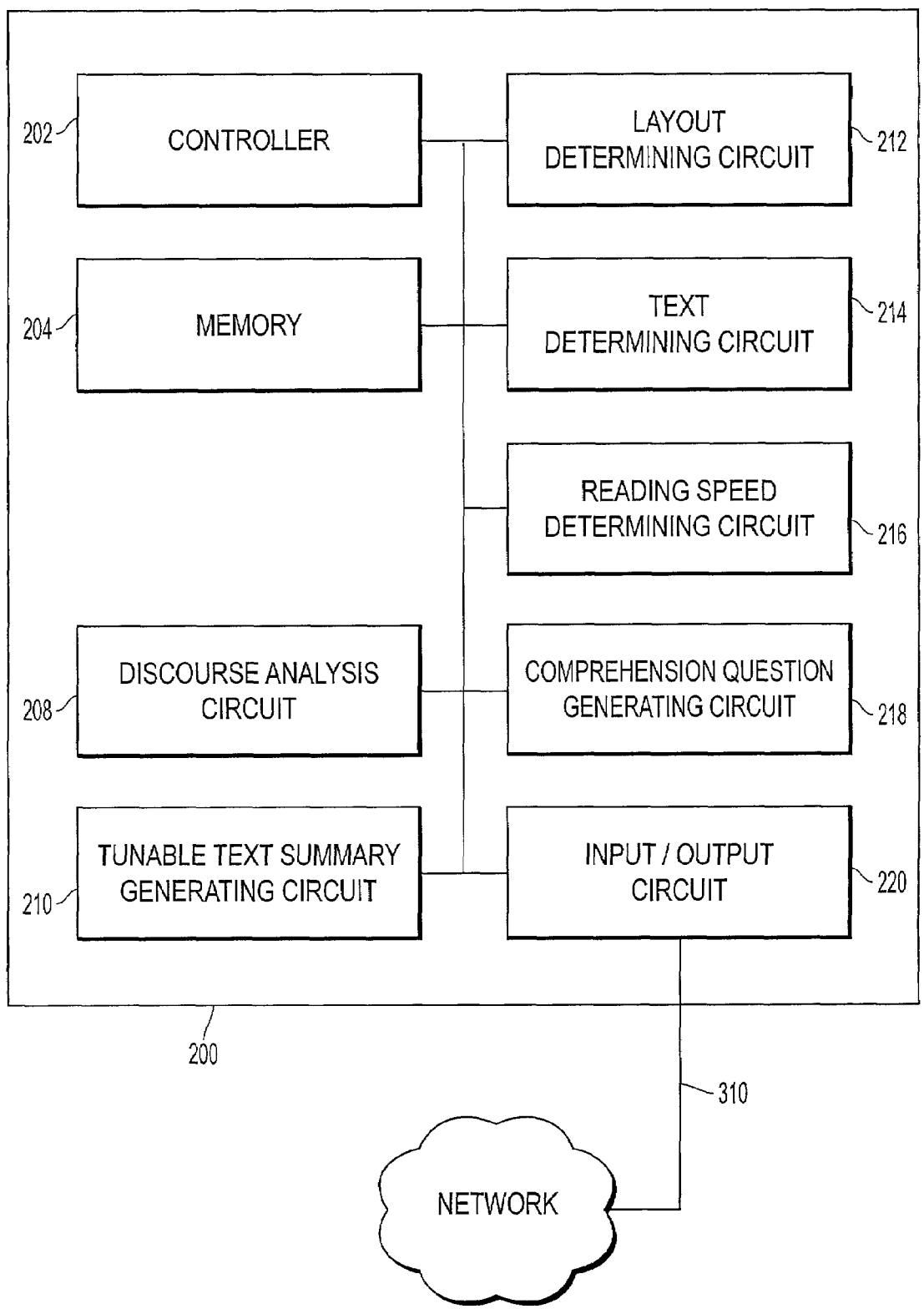
FIG. 6 shows an exemplary sentence-level dynamic personalized reading instruction system according to this invention.

FIG. 6 shows an exemplary sentence level dynamic personalized reading instruction system 200 according to this invention. Controller 202, memory 204, discourse analysis circuit 208, tunable text summary generating circuit 210, layout determining circuit 212, text determining circuit 214, reading speed determining circuit 216 and comprehension question generating circuit 218 are connected through input/output circuit 220 to communications links 310.

Controller 202 receives reading level information, learning gradient and personalization information for a user through input/output circuit 220 over communications links 310. In various other embodiments according to this invention, reading level, learning gradient and personalization information may be retrieved from memory 204 for the user based on a user identifier.

A text is selected for instruction and loaded into memory 204. The instructional text may be selected automatically based on the determined reading level of the user, specified by an instructor, determined using personalization information such as cultural background or determined using any other known or later developed method.

Discourse analysis circuit 208 is activated to analyze the selected text based on a theory of discourse. For example, the Linguistic Discourse Model theory of discourse analysis may be used to analyze the selected text. It will be apparent that use of the Linguistic Discourse Model is merely exemplary and that any theory of discourse analysis useable to generate a grammatical tunable text summary may be used in the practice of this invention.

The tunable text summary generating circuit 210 is activated to determine a grammatical tunable summary of the text based on the determined reading level, learning gradient and personalization information. The tunable text summary is used to generate grammatical sentences comprising the salient information in the sentence.

Layout determining circuit 212 is activated to determine a text layout based on the determined reading level and personalization information. For a lower reading level user, a simpler less complicated text layout allows familiarity and confidence to be gained with the printed text. As a user progresses to higher reading levels, complexity of the text layout increases. Personalization information such as language may also be used to determine text layout attributes such as vertical alignment and preferred placement of the comprehension aids. For example, languages such as Japanese and Chinese are traditionally printed from top to bottom. However, if the personalization information indicates that the user's mother tongue is "English", the language of instruction is Japanese and the user's determined reading level is low, a horizontal orientation of the text is selected since this best utilizes the user's "English" cultural and background and reading level. However, if the personalization information indicates the user's mother tongue is "Japanese" then a traditional vertical orientation of the text may be selected since this orientation best utilizes the user's "Japanese" cultural background and reading level. It will be apparent that cultural personalization described above is merely exemplary and that any known or later developed method of using personalization information and reading level information to accelerate reading instruction maybe used in the practice of this invention.

Text determining circuit 214 is activated to further personalize the text based on user reading level and personalization information. For example, the text may be analyzed and the name of the heroine changed to reflect the user's name. The complexity of the sentences derived from the tunable text summary and selected for display to the user are dynamically adjusted based on the determined user reading level. In various exemplary embodiments according this invention, the tunable text summary is also used to display personalized help to the user by dynamically changing display attributes of the salient information in displayed sentences. In this way a user's existing knowledge may be exploited in acquiring and integrating new information concerning unfamiliar language constructs.

The reading speed determining circuit 216 is activated to determine the reading speed of a user. The comprehension question generating circuit 218 is activated to generate comprehension questions for the associated text based on the tunable text summary. The determined reading speed and the user responses to the generated comprehension questions are used in conjunction with the learning gradient and personalization information to dynamically determine a new reading level for the user.

Figure 7:
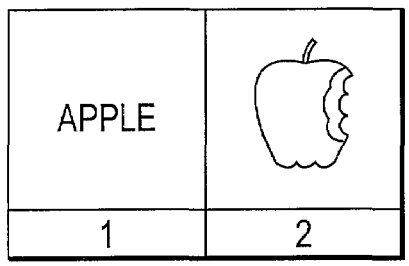
FIG. 7 shows a first layout according to an exemplary embodiment of a dynamic personalized reading instruction system according to this invention.

FIG. 7 shows a first text layout according to an exemplary embodiment of the word level dynamic personalized reading instruction system 100 according to this invention. The word "apple" of panel 1 is displayed using a simple uncomplicated layout that familiarizes the user with the appearance of printed information on a page. A comprehension aid, such as a graphic icon of an apple of panel 2 is displayed on the second page.

The word "apple" and the graphic icon of "apple" appear in substantially the same position on the two pages. For lower reading level user's, the layout or positioning of the visual aid is selected to reinforce the equivalence between the graphic icon of the apple and the associated word. In various other embodiments according to this invention, the text layout may be based on user personalization information such as age, reading level in a first and/or second language, or any other known or later developed attribute useful in determining appropriate text layout.

Figure 8:
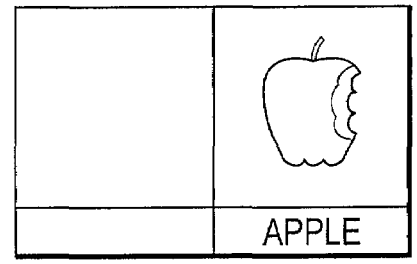
FIG. 8 shows a second layout according to an exemplary embodiment of a dynamic personalized reading instruction system according to this invention.

FIG. 8 shows a second text layout according to an exemplary embodiment of the word level dynamic personalized reading instruction system 100 according to this invention. The word "apple" is displayed immediately below the graphic icon or comprehension aid of an apple to reinforce the equivalence between the graphic icon and the word.

Figure 9:
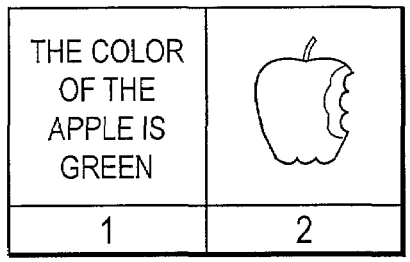
FIG. 9 shows a third layout according to an exemplary embodiment of a dynamic personalized reading instruction system according to this invention.

FIG. 9 a third text layout of an exemplary embodiment of the sentence level dynamic personalized reading instruction system 200 according to this invention. An exemplary sentence is displayed on one page (panel 1) with the word "green" displayed in a green font. A graphical icon of a green apple is displayed on the second page (panel 2). In various other exemplary embodiments according to this invention, the word "green" slowly changes from green to red as the font color of the word also changes from green to red. Simultaneously the graphic icon of the apple changes from green to red to reinforce the concept of color. It will be apparent that the use of changing text colors is merely exemplary and that any known or later developed method of indicating changes of the text may be used in the practice of this invention.

Figure 10:
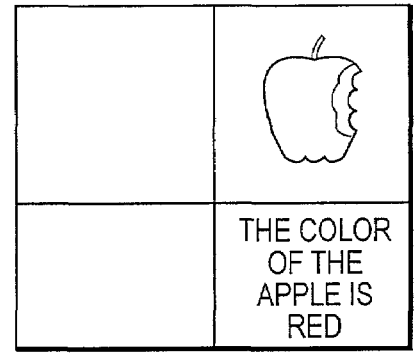
FIG. 10 shows a fourth layout according to an exemplary embodiment of a dynamic personalized reading instruction system according to this invention.

FIG. 10 is a fourth text layout of an exemplary embodiment of the sentence level dynamic personalized reading instruction system 200 according to this invention. The sentence, "The color of the apple is red" is displayed directly below the graphical representation of a red apple.

Figure 11:
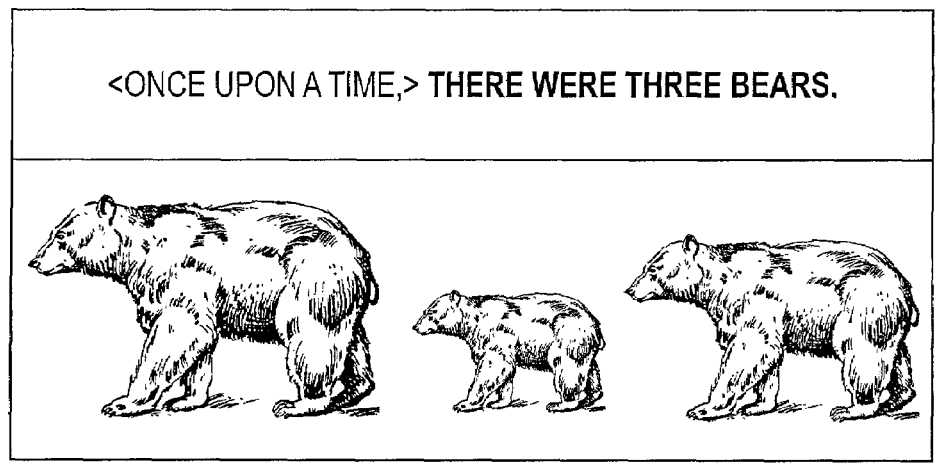
FIG. 11 shows a first exemplary display according to an embodiment of a sentence level dynamic personalized reading instruction system according to this invention.

FIG. 11 shows an exemplary display according to one embodiment of this invention. The sentence comprises the two phrases "Once upon a time" and "there were three bears". Users having lower reading levels may have difficulty understanding the phrase "once upon a time" since it relates to the abstract concept of time. Moreover, lower level users who encounter difficulty with the phrase will begin parsing the text one sentence at time. The continuity of the text will be interrupted as a user focuses on the meaning of the individual words within the phrase. The focus of the user's attention on individual word meanings will prevent the user from realizing that the most salient information occurs later in the sentence.

However, in various exemplary embodiments according to this invention, the most salient information is emphasized and/or highlighted. The user's focus of attention is therefore drawn to the most salient information even though it appears later in the sentence. Once the most important information is understood to relate to the phrase "there were three bears" the user more readily understands that the first phrase "Once upon a time" is an optional convention. The user is not required to slow their reading. The user is able to concentrate on understanding the story by reading multiple sentences together since the emphasis or highlighting helps indicate the most salient information in each sentence. Thus, a user experiencing difficulty may learn the central idea of a paragraph by focusing on the highlighted portions. Once the main idea is understood, the meaning of less salient information is gleaned by re-reading the text and integrating the concept information into information already assimilated from the text.

In various other exemplary embodiments according to this invention, the user may request help understanding difficult portions of the text such as "Once upon a time" by clicking on the displayed text portion. A comprehension aid associated with the selected concept is then displayed. The comprehension aid may include graphic icons representing the concept, pictures, sounds, additional text movie clips or any other known or later developed information useful in explaining the concept.

Figure 12:
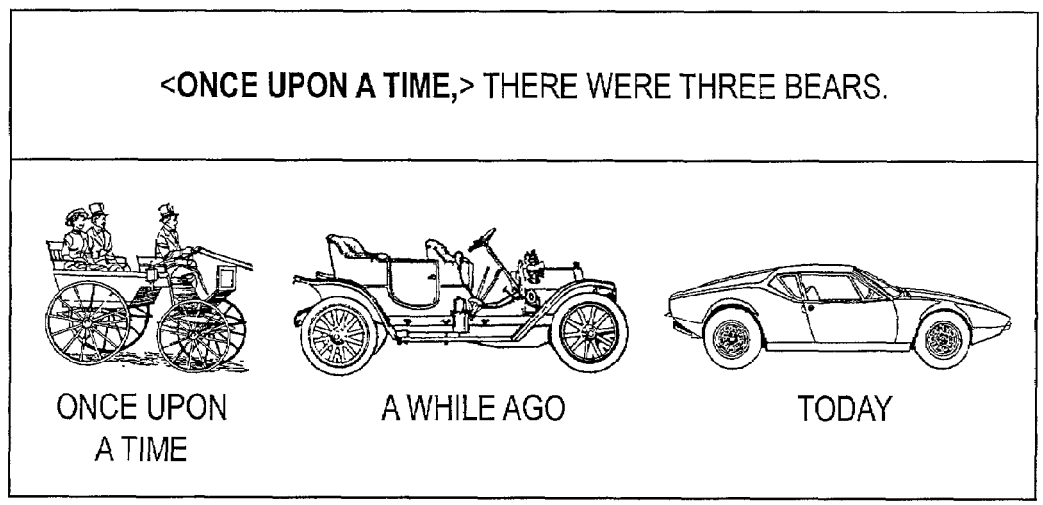
FIG. 12 shows a second exemplary display according to an embodiment of a sentence level dynamic personalized reading instruction system according to this invention.

FIG. 12 shows an exemplary sentence displayed according to one embodiment of this invention. The concept "once upon a time" has been displayed using a comprehension aid. A progression of graphic icons representing vehicles of different ages is displayed to the user below the sentence. The pictures show how the concept of "once upon a time" relates to the age. It will be apparent that the graphic icons comprehension aids for the concept are merely exemplary and that any known or later developed information useful in explaining the concept may be used in the practice of this invention. Moreover, it will be apparent that personalization information may be used to select more appropriate comprehension aids based on age, culture or any other personalization information.

Figures 13, 14:
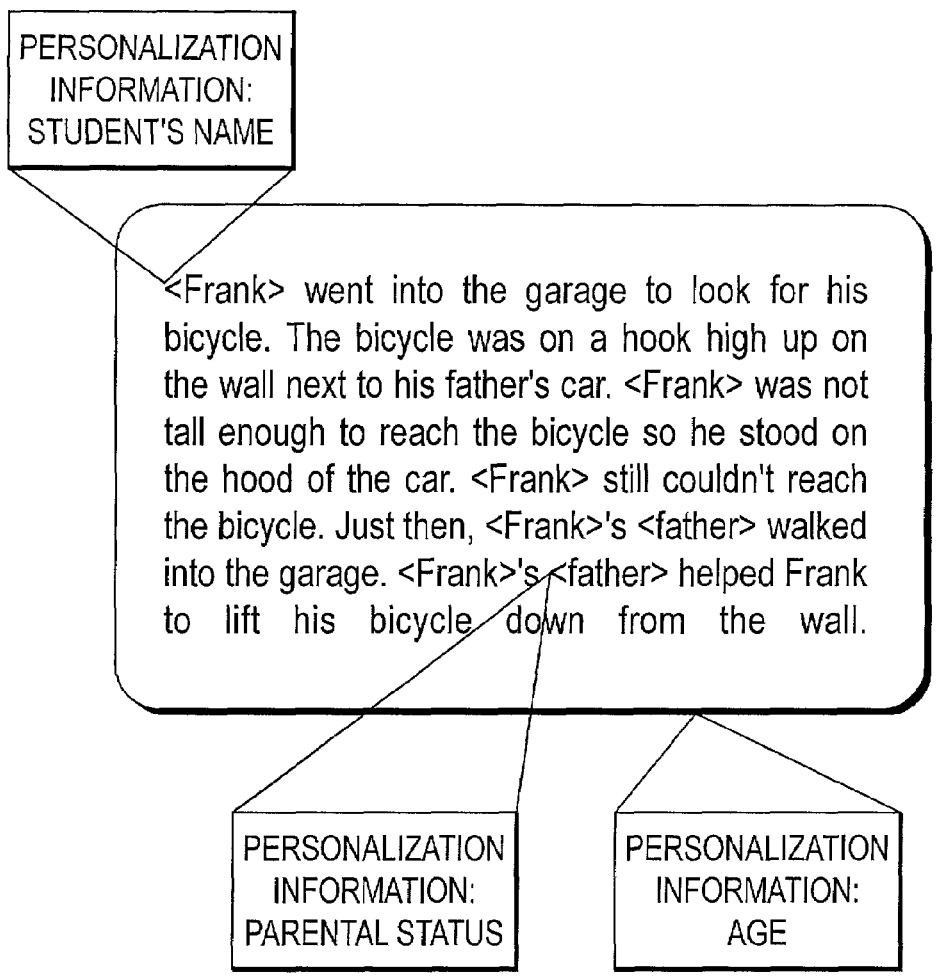
FIG. 13 shows an exemplary text personalized according to an embodiment of this invention.
FIG. 14 shows an exemplary personalized text according to an embodiment of this invention.

FIG. 13 shows an exemplary text personalized according to an embodiment of this invention. The exemplary text is personalized with a user name of "Frank" and parental status and age information. The use of part of speech information in conjunction with the tunable text summary allows the substitution of personalized name, parental information or any other known or later developed personalization information into the text for each user. In this way, a personalized text is created that holds the attention of the user. The portion of text between angled brackets reflects information personalized for a user named "Frank".

FIG. 14 shows an exemplary personalized text according to this invention. Salient information in the exemplary text has been highlighted as a comprehension aid. The user is better able to recognize and understand written conventions such as transitions between phrases when the salient information in the sentence is displayed and brought directly to the user's attention by changing the font display attribute to a bolded display font. For example, the first personalized sentence "Frank went into the garage to look for his bicycle" is not compressed since each word is important in conveying salient information to the user. The second sentence, "The bicycle was on a hook high up on the wall next to his father's car" contains salient information "The bicycle was on a hook on the wall". The salient information is highlighted to quickly drawn the attention of a user.

In the various exemplary embodiments outlined above, the systems for dynamic personalized reading instruction 100-300 can be implemented using a programmed general purpose computer. However, the systems for dynamic personalized reading instruction 100-300 can also be implemented using a special purpose computer, a programmed microprocessor or micro-controller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 2-3 can be used to implement the systems for dynamic personalized reading instruction 100-300.

Each of the circuits 101-116 and 201-220 of the systems for dynamic personalized reading instruction 100-300 outlined above can be implemented as portions of a suitably programmed general purpose computer. Alternatively, 101-116 and 201-220 of the systems for dynamic personalized reading instruction 100-300 outlined above can be implemented as physically distinct hardware circuits within an ASIC, or using a FPGA, a PDL, a PLA or a PAL, or using discrete logic elements or discrete circuit elements. The particular form each of the circuits 101-116 and 201-220 of the systems for dynamic personalized reading instruction 100-300 outlined above will take is a design choice and will be obvious and predicable to those skilled in the art.

Moreover, the systems for dynamic personalized reading instruction 100-300 and/or each of the various circuits discussed above can each be implemented as software routines, managers or objects executing on a programmed general purpose computer, a special purpose computer, a microprocessor or the like. In this case, the systems for dynamic personalized reading instruction 100-300 and/or each of the various circuits discussed above can each be implemented as one or more routines embedded in the communications network, as a resource residing on a server, or the like. The systems for dynamic personalized reading instruction 100-300 and the various circuits discussed above can also be implemented by physically incorporating the systems for dynamic personalized reading instruction 100-300 into a software and/or hardware system, such as the hardware and software systems of a web server or a client device.

As shown in FIGS. 5-6, memory 104 and 204 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 310 shown in FIGS. 1 and 4-6 can each be any known or later developed device or system for connecting a communication device to the systems for dynamic personalized reading instruction 100-300, including a direct cable connection, a connection over a wide area network or a local area network, a connection over an intranet, a connection over the Internet, or a connection over any other distributed processing network or system. In general, the communication links 310 can be any known or later developed connection system or structure usable to connect devices and facilitate communication Further, it should be appreciated that the communication links 310 can be a wired or wireless links to a network. The network can be a local area network, a wide area network, an intranet, the Internet, or any other distributed processing and storage network.

While this invention has been described in conjunction with the exemplary embodiments outlines above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A computerized method of dynamic personalized reading instruction comprising the computer-implemented steps of:
   determining a first word recognition level of a user;
   displaying words to the user based on the determined first word recognition level from a set of words classified by word recognition levels;
   providing at least one comprehension aid to the user, the provided comprehension aid operable to help the user to comprehend the displayed words;
   determining word recognition errors based on user comprehension of the displayed words using the at least one comprehension aid provided to the user; and
   determining a second word recognition level of the user based on the determined word recognition errors.

2. The computerized method of claim 1, wherein the first word recognition level is determined based on at least one of: age, scholastic grade and level within the grade, and an interactive test sequence.

3. The computerized method of claim 1, wherein at least one of a set of words in the set of words classified by word recognition level is associated with a comprehension aid.

4. The computerized method of claim 3, wherein the comprehension aid is a human sensible explanation of the concept of at least one classified word.

5. The computerized method of claim 4, wherein the human sensible explanation of the concept is at least one of: a graphic icon, an animation, audio information, and video information.

6. A computerized method of dynamic personalized reading instruction comprising the computer-implemented steps of:
   determining a text;
   analyzing the text based on a theory of discourse analysis;
   determining a first user reading level;
   displaying a grammatical tunable text summary to the user based on the determined user reading level;
   providing at least one comprehension aid to the user, the provided comprehension aid operable to help the user to comprehend the text;
   determining user comprehension of the text using the at least one comprehension aid provided to the user; and
   determining a further user reading levels based on the user comprehension and reading level.

7. The computerized method of claim 6, further comprising the step of displaying salient information from the grammatical tunable text summary based on at least one of: a user request, determined reading speed, and determined comprehension level.

8. The computerized method of claim 7, wherein the text is analyzed based on at least one of: the Discourse Structures Theory, Linguistic Discourse Model, Rhetorical Structure Theory, Systemic Functional Grammar, and Tagmemics.

9. The computerized method of claim 7, wherein a first user reading level is determined based on at least one of: age, academic grade and level within the grade, and interactive test performance.

10. The computerized method of claim 9, wherein at least one comprehension aid is associated with at least one portion of the grammatical tunable text summary.

11. The computerized method of claim 10, wherein the at least one comprehension aid is a human sensible concept explanation for at least one of the portions of the grammatical tunable text summary.

12. The computerized method of claim 11, wherein the at least one comprehension aid includes at least one of: a graphic icon, an animation, audio information, and video information.

13. A computerized method of combined word and sentence level dynamic personalized reading instruction comprising the computer-implemented steps of:
   providing word level dynamic personalized instruction comprising the steps of:
      determining a first word recognition level of a user;
      displaying to the user words based on the determined first word recognition level from a set of words classified by word recognition levels;
      providing at least one comprehension aid to the user, the provided comprehension aid operable to help the user to comprehend the displayed words;
      determining word recognition error based on user comprehension of a word using the at least one comprehension aid provided to the user;
      determining a second word recognition level of the user based on the determined user word recognition errors;
   providing sentence level dynamic personalized instruction comprising the steps of:
      determining a text;
      analyzing the text based on a theory of discourse analysis;
      determining a first user reading level;
      displaying a grammatical tunable text summary based on the determined reading level;
      determining user comprehension of the text; and
      determining a second user reading level based on the user comprehension and reading level.

14. A system for dynamic personalized reading instruction comprising:
   a controller;
   a memory for storing words and comprehension aids classified by word recognition levels;
   a word recognition level determining circuit for determining a word recognition level of a user;
   a word display circuit for displaying to the user words from the stored words based on the determined word recognition level;
   a recognition error determining circuit for determining user recognition errors;
   a comprehension aid display circuit for displaying comprehension aids to the user based on the determined user recognition errors; and
   a word recognition level adjusting circuit adjusting the word recognition level of the user based on the determined recognition user errors.

15. The system of claim 14, wherein a first word recognition level is determined based on at least one of: age, scholastic grade and level within the grade, and an interactive test sequence.

16. The system of claim 14, wherein at least one of a set of words in the set of words classified by word recognition level is associated with a comprehension aid.

17. The system of claim 16, wherein the comprehension aid is a human sensible explanation of the concept of at least one classified word.

18. The system of claim 17, wherein the human sensible explanation of the concept is at least one of: a graphic icon, an animation, audio information, and video information.

19. A system for dynamic personalized reading instruction comprising:
   a memory;
   an input/output circuit for loading a selected text into the memory;
   a discourse analysis circuit for analyzing the text;
   a grammatical tunable text summary generating circuit for determining a grammatical tunable text summary of the analyzed text;
   a text determining circuit for determining display text based on a determined reading level information of a user;
   a comprehension question generating circuit for generating comprehension questions to the user based on the grammatical tunable text summary; and
   a controller for determining a new reading level of the user based on at least one of the determined user comprehension and reading speed.

20. The system of claim 19, wherein salient information from the grammatical tunable text summary is displayed based on at least one of: a user request, determined reading speed, and determined comprehension.

21. The system of claim 19, wherein the text is analyzed based on at least one of: the Discourse Structures Theory, Linguistic Discourse Model, Rhetorical Structure Theory, Systemic Functional Grammar, and Tagmemics.

22. The system of claim 19, wherein a first user reading level is determined based on at least one of: age, academic grade and level within the grade, and interactive test performance.

23. The system of claim 22, wherein at least one comprehension aid is associated with at least one portion of the grammatical tunable text summary.

24. The system of claim 23, wherein the at least one comprehension aid is a human sensible concept explanation for at least one of the portions of the grammatical tunable text summary.

25. The system of claim 24, wherein the at least one comprehension aid includes at least one of: a graphic icon, an animation, audio information, and video information.

26. A system of combined word and sentence level dynamic personalized reading instruction comprising:
   a word level dynamic personalized instruction comprising:
      a controller;
      a memory for storing words, comprehension aids classified by word recognition levels and a text;
      a word recognition level determining circuit for determining a word recognition level of a user;
      a word display circuit for displaying words from the stored words based on the determined word recognition level;
      a recognition error determining circuit for determining user recognition errors;
      a comprehension aid display circuit for displaying comprehension aids to the user based on the determined user recognition errors;
      a word recognition level adjusting circuit adjusting the word recognition level based on the determined user recognition errors; and
   a sentence level dynamic personalized instruction circuit comprising:
      an input/output circuit for loading a selected text into the memory;
      a discourse analysis circuit for analyzing the text;
      a grammatical tunable text summary generating circuit for determining a grammatical tunable text summary of the analyzed text;
      a text determining circuit for determining display text based on a determined reading level information of the user;
      a comprehension question generating circuit for generating comprehension questions to the user based on the grammatical tunable text summary; and
      a controller for determining a new reading level of the user based on at least one of the determined user comprehension and reading speed.

27. A computerized method of dynamic personalized reading instruction comprising the computer-implemented steps of:
   determining a text in a first language;
   analyzing the text based on a theory of discourse analysis;
   determining a first reading level of a user;
   displaying a grammatical tunable text summary based on the determined reading level;
   determining user comprehension errors for the text;
   displaying comprehension aids based on at least the determined user comprehension errors, a language of instruction, and the determined user reading level; and
   determining a second user reading level based on the user comprehension and reading level.

28. A computer readable storage medium, comprising a computer readable pro gram code embodied on the computer readable storage medium, the computer readable program code usable to program a computer to perform dynamic personalized reading instruction further comprising:
   instructions for determining a first word recognition level of a user;
   instructions for displaying words based on the determined word recognition level of a user from a set of words classified by word recognition levels;
   instructions for providing at least one comprehension aid to the user, the provided comprehension aid operable to help the user to comprehend the displayed words;
   instructions for determining word recognition errors based on user comprehension of a word using the at least one comprehension aid provided to the user; and
   instructions for determining a second word recognition level of a user, the first word recognition level being dynamically adjusted based on the determined word recognition errors, wherein the first word recognition level is determined based on at least one of: age, scholastic grade and level within the grade, and an interactive test sequence.

29. A computer readable storage medium, comprising a computer readable program code embodied on the computer readable storage medium, the computer readable program code usable to program a computer to perform dynamic personalized reading instruction further comprising:
   instructions for determining a text;
   instructions for analyzing the text based on a theory of discourse analysis;
   instructions for determining a first user reading level;
   instruction for displaying a grammatical tunable text summary based on the determined reading level;
   instructions for providing at least one comprehension aid to the user, the provided comprehension aid operable to help the user to comprehend the displayed text;
   instructions for determining user comprehension of the text using the at least one comprehension aid provided to the user;
   instructions for determining further user reading levels based on the user comprehension and reading level; and
   displaying salient information from the grammatical tunable text summary based on at least one of: a user request, determined reading speed, and determined comprehension level.

30. A computer readable storage medium, comprising a computer readable program code embodied on the computer readable storage medium, the computer readable program code usable to program a computer to perform dynamic personalized reading instruction further comprising:
   instructions for determining a first word recognition level of a user;
   instructions for displaying to the user words based on the determined word recognition level from a set of words classified by word recognition levels;
   instructions for providing at least one comprehension aid to the user, the provided comprehension aid operable to help the user to comprehend the displayed words;
   instructions for determining word recognition errors based on user comprehension of a word using the at least one comprehension aid provided to the user; and
   instructions for determining a second word recognition level of the user, the first word recognition level being dynamically adjusted based on the determined word recognition errors.

31. A computer readable storage medium, comprising a computer readable program code embodied on the computer readable storage medium, the computer readable program code usable to program a computer to perform dynamic personalized reading instruction further comprising:
   instructions for determining a text;
   instructions for analyzing the text based on a theory of discourse analysis;

instructions for determining a first user reading level;
instruction for displaying to the user a grammatical tunable text summary based on the determined reading level;
instructions for providing at least one comprehension aid to the user, the provided comprehension aid operable to help the user to comprehend the displayed text;
instructions for determining user comprehension of the text using the at least one comprehension aid provided to the user; and
instructions for determining a further user reading levels based on the user comprehension and reading level.

* * * * *